United States Patent
Shindo et al.

(10) Patent No.: US 7,178,983 B2
(45) Date of Patent: Feb. 20, 2007

(54) SPINDLE MOTOR AND MAGNETIC DISK DRIVE

(75) Inventors: Hitoshi Shindo, Kanagawa (JP); Marutomo Goto, Kanagawa (JP); Takashi Kouno, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 144 days.

(21) Appl. No.: 11/094,018

(22) Filed: Mar. 29, 2005

(65) Prior Publication Data

US 2005/0220380 A1    Oct. 6, 2005

(30) Foreign Application Priority Data

Mar. 30, 2004  (JP) ............................. 2004-098029

(51) Int. Cl.
*F16C 32/06* (2006.01)
(52) U.S. Cl. ................. 384/107; 384/100; 384/112
(58) Field of Classification Search ........... 384/100, 384/107, 111–112; 360/99.08, 98.06
See application file for complete search history.

(56) References Cited

U.S. PATENT DOCUMENTS 5,707,154 A * 1/1998 Ichiyama ................ 384/107
6,059,459 A * 5/2000 Ichiyama ................ 384/112

FOREIGN PATENT DOCUMENTS

| JP | 2000-329141 | 11/2000 |
|---|---|---|
| JP | 2003-322146 | 11/2003 |

* cited by examiner

Primary Examiner—Thomas R. Hannon
(74) Attorney, Agent, or Firm—Townsend and Townsend and Crew LLP; Duke Amaniampong (57) ABSTRACT

A rotational member and a stationary member included in a spindle motor provided with air bearings are electrically connected while the bearing is rotating, and abrasion of the rotational member and the stationary member at stages of starting and stopping and damaging the rotational member and the stationary member by external shocks that may be exerted thereon during transportation and handling are avoided. In one embodiment, a sleeve is formed integrally with a motor base. The sleeve has an inside surface serving as a radial-bearing surface that forms a radial bearing together with the outside surface of a rotational shaft, and a thrust-bearing surface that forms thrust bearing together with a thrust plate attached to the rotational shaft. The radial-bearing surface of the sleeve is provided with a recess (groove) for holding lubricating oil while the rotational shaft is rotating. A gap not forming a bearing is formed between the circumference of the thrust plate and the inside surface of the sleeve to hold the lubricating oil while the rotational shaft is rotating.

18 Claims, 4 Drawing Sheets

SPINDLE MOTOR AND MAGNETIC DISK DRIVE

CROSS-REFERENCES TO RELATED APPLICATIONS

This application claims priority from Japanese Patent Application No. JP2004-098029, filed Mar. 30, 2004, the entire disclosure of which is incorporated herein by reference.

BACKGROUND OF THE INVENTION

The present invention relates to a spindle motor capable of operating at a high rotational speed, and a magnetic disk drive capable of transferring data at a high data transfer rate.

Clients require a magnetic disk drive for use in a server to operate at a high data transfer rate. A disk needs to be rotated at a high rotational speed to meet such a requirement. A bearing mechanism according to an invention excellent in stability and bearing rigidity disclosed in Japanese Patent Laid-Open No. 2003-322146 includes a hydrodynamic radial air bearing unit having a shaft, a thrust disk attached to the shaft so as to extend perpendicularly to the shaft, and a cylindrical sleeve capable of rotating relative to the shaft and the thrust disk and defining an annular space filled with air as a working fluid together with the shaft; and a hydrodynamic thrust oil bearing unit having the thrust disk, and the cylindrical sleeve defining a space filled with an oil as a working fluid together with the thrust disk. The diameter of the hydrodynamic thrust oil bearing is greater than that of the hydrodynamic radial air bearing.

Electrical connection of a rotational member and a stationary member of an air bearing suitable for high-speed rotation is an important technical subject. An invention disclosed in Japanese Patent Laid-Open No. 2000-329141 intended to connect electrically a rotational member and a stationary member at all times for the conduction of static electricity generated in the rotational member to the stationary member fills up a space between the rotational member and the stationary member, around the axis of rotation where the rotational speed of the rotational member relative to the stationary member is the lowest or in a region where a gas necessary for generating hydrodynamic pressure for a bearing is neither sucked nor discharged, with a magnetic fluid.

BRIEF SUMMARY OF THE INVENTION

It is difficult to employ a most prevalently used FDB (fluid bearing) that uses lubricating oil at rotational speeds exceeding 20 krpm from the view point of power consumption and heat generation in a magnetic disk drive required to operate at a high rotational speed. Holding lubricating oil in the bearing is an important subject with the bearing using lubricating oil. In an air bearing suitable for high-speed operation, abrasion of the air bearing at stages of starting and stopping and damaging the air bearing by shocks that may be exerted on the air bearing during transportation and handling are problems in addition to a problem relating with the electrical connection of the rotational and the stationary members of the air bearing. The known techniques are unable to avoid abrading the bearing at stages of starting and stopping the bearing and damaging the bearing by external shocks that act on the bearing during transportation and handling.

It is a feature of the present invention to provide a spindle motor provided with a bearing including a rotational member and a stationary member which are electrically connected during rotation, and capable of avoiding being abraded at stages of starting and stopping and being damaged by external shocks that may be exerted thereon during transportation and handling.

Another feature of the present invention is to provide a magnetic disk drive capable of transferring data at a high data transfer rate.

Embodiments of the present invention are characterized in using an air bearing and lubricating oil in combination, preventing abrading and damaging a bearing unit by making lubricating oil flow into the bearing unit while the bearing unit is not rotating, suppressing power consumption and heat generation by discharging the lubricating oil from the bearing unit by centrifugal force and holding the lubricating oil in a region outside the bearing to maintain the electrical connection of a rotational member and a stationary member of the bearing while the bearing unit is rotating.

A spindle motor according to an aspect of the present invention includes a motor base having a thrust-bearing surface; a sleeve attached to the motor base and having an interior radial bearing surface and a thrust-bearing surface; a stator yoke put on the sleeve so as to surround the sleeve, and holding a coil thereon; a rotational shaft inserted in the sleeve, provided at one end thereof with a thrust plate having opposite thrust-bearing surfaces facing the respective thrust-bearing surfaces of the motor base and the sleeve, and at the other end thereof with a hub having a radial bearing surface facing the radial-bearing surface of the sleeve; and a rotor magnet attached to a part of the hub facing the stator yoke. The radial-bearing surface of the sleeve includes a lubricating oil holding mechanism to hold lubricating oil while the rotational shaft is rotating, and a gap not forming a bearing is formed between the circumference of the thrust plate and the inside surface of the sleeve to hold the lubricating oil while the rotational shaft is rotating.

In some embodiments, the lubricating oil holding mechanism comprises a recess formed in the radial-bearing surface of the sleeve. The lubricating oil holding mechanism may be an annular groove formed in the radial-bearing surface of the sleeve.

A spindle motor according to another aspect of the present invention includes a motor base having a thrust-bearing surface; a sleeve attached to the motor base and having a radial bearing surface and a thrust-bearing surface; a stator yoke put on the sleeve so as to surround the sleeve, and holding a coil thereon; a rotational shaft provided at one end thereof with a thrust plate having opposite thrust bearing surfaces facing the respective thrust-bearing surfaces of the motor base and the sleeve, and at the other end thereof with a hub, having a radial bearing surface extending from the thrust plate to the hub, and inserted in the sleeve to form a radial bearing between the rotational shaft and the radial-bearing surface of the sleeve and to form a thrust bearing between the respective thrust-bearing surfaces of the motor base and the sleeve; and a rotor magnet attached to a part of the hub facing the stator yoke. The radial-bearing surface of the sleeve is provided with a recess, and a gap not forming a bearing is formed between the circumference of the thrust plate and the inside surface of the sleeve, lubricating oil is held in the radial bearing and the thrust bearing while the rotational shaft is at a standstill, and the lubricating oil is held in the recess and the gap while the rotational shaft is rotating.

In some embodiments, the recess is an annular groove formed in the radial-bearing surface of the sleeve.

A spindle motor according to another aspect of the present invention includes a motor base having a thrust-bearing surface; a sleeve attached to the motor base, and having an inside radial-bearing surface provided with a recess and a thrust-bearing surface perpendicular to the radial-bearing surface; a stator yoke put on the sleeve so as to surround the sleeve; a coil wound around the stator yoke; a rotational shaft inserted in the sleeve, having a radial-bearing surface facing the radial-bearing surface of the sleeve, provided at one end thereof with a thrust plate having opposite thrust bearing surfaces facing the respective thrust bearing surfaces of the motor base and the sleeve, and a circumference defining a gap not forming a bearing together with the inside surface of the sleeve, and at the other end thereof with a hub; a rotor magnet attached to a part of the hub facing the stator yoke; and lubricating oil that is held in the recess and the gap while the rotational shaft is rotating, and flows from the recess and the gap into a radial bearing having the radial-bearing surfaces and into a thrust bearing having the thrust surfaces while the rotational shaft is at a standstill.

In some embodiments, the recess comprises an annular groove formed in the radial bearing surface of the sleeve. The recess may include a plurality of annular grooves formed in the radial-bearing surface of the sleeve. The radial-bearing surface of the sleeve and the thrust-bearing surfaces of the thrust plate are provided with dynamic pressure generating grooves formed in a herringbone shape. A peripheral part of the thrust-bearing surface of the sleeve and a peripheral part of the thrust-bearing surface of the motor base are inclined so as to extend away from the thrust plate.

A magnetic disk drive according to another aspect of the present invention includes a case; a spindle motor installed in the case; a magnetic disk mounted on a hub included in the spindle motor; and a magnetic head for writing information to and reading recorded information from the magnetic disk. The spindle motor includes a motor base having a thrust-bearing surface; a sleeve attached to the motor base and having an interior radial bearing surface and a thrust-bearing surface; a stator yoke put on the sleeve so as to surround the sleeve, and holding a coil thereon; a rotational shaft inserted in the sleeve, provided at one end thereof with a thrust plate having opposite thrust-bearing surfaces facing the respective thrust-bearing surfaces of the motor base and the sleeve, and at the other end thereof with a hub having a radial bearing surface facing the radial-bearing surface of the sleeve; and a rotor magnet attached to a part of the hub facing the stator yoke. The radial-bearing surface of the sleeve includes a lubricating oil holding mechanism to hold lubricating oil while the rotational shaft is rotating, and a gap not forming a bearing is formed between the circumference of the thrust plate and the inside surface of the sleeve to hold the lubricating oil while the rotational shaft is rotating.

A magnetic disk drive according to another aspect of the present invention includes a case; a spindle motor installed in the case; a magnetic disk mounted on a hub included in the spindle motor; and a magnetic head for writing information to and rereading recorded information from the magnetic disk. The spindle motor includes a motor base having a thrust-bearing surface; a sleeve attached to the motor base and having a radial bearing surface and a thrust-bearing surface; a stator yoke put on the sleeve so as to surround the sleeve, and holding a coil thereon; a rotational shaft provided at one end thereof with a thrust plate having opposite thrust bearing surfaces and at the other end thereof with a hub, having a radial bearing surface extending from the thrust plate to the hub, and inserted in the sleeve to form a radial bearing between the rotational shaft and the radial-bearing surface of the sleeve and to form a thrust bearing between the respective thrust-bearing surfaces of the motor base and the sleeve; and a rotor magnet attached to a part of the hub facing the stator yoke. The radial-bearing surface of the sleeve is provided with a recess, and a gap not forming a bearing is formed between the circumference of the thrust plate and the inside surface of the sleeve, lubricating oil is held in the radial bearing and the thrust bearing while the rotational shaft is at a standstill, and the lubricating oil is held in the recess and the gap while the rotational shaft is rotating.

A magnetic disk drive according to another aspect of the present invention includes a case; a spindle motor installed in the case; a magnetic disk mounted on a hub included in the spindle motor; and a magnetic head for writing information to and reading recorded information from the magnetic disk. The spindle motor includes a motor base having a thrust-bearing surface; a sleeve attached to the motor base, and having an inside radial-bearing surface provided with a recess and a thrust-bearing surface perpendicular to the radial-bearing surface; a stator yoke attached to the sleeve so as to surround the sleeve; a coil wound around the stator yoke; a rotational shaft inserted in the sleeve, and provided at one end thereof with a thrust plate having a radial-bearing surface facing the radial-bearing surface of the sleeve, opposite thrust bearing surfaces facing the respective thrust bearing surfaces of the motor base and the sleeve, and a circumference defining a gap not forming a bearing together with the inside surface of the sleeve, and at the other attached to the other end thereof; a rotor magnet attached to a part of the hub facing the stator yoke; and lubricating oil that is held in the recess and the gap while the rotational shaft is rotating, and flows from the recess and the gap into a radial bearing having the radial-bearing surfaces and into a thrust bearing having the thrust surfaces while the rotational shaft is at a standstill.

According to embodiments of the present invention, the spindle motor has the rotational member and the stationary member electrically connected to the rotational member while the bearing is rotating and is capable of avoiding being abraded at stages of starting and stopping and being damaged by external shocks that may be exerted thereon during transportation and handling. The magnetic disk drive is capable of transferring data at a high data transfer rate.

DETAILED DESCRIPTION OF THE INVENTION

Figure 4:
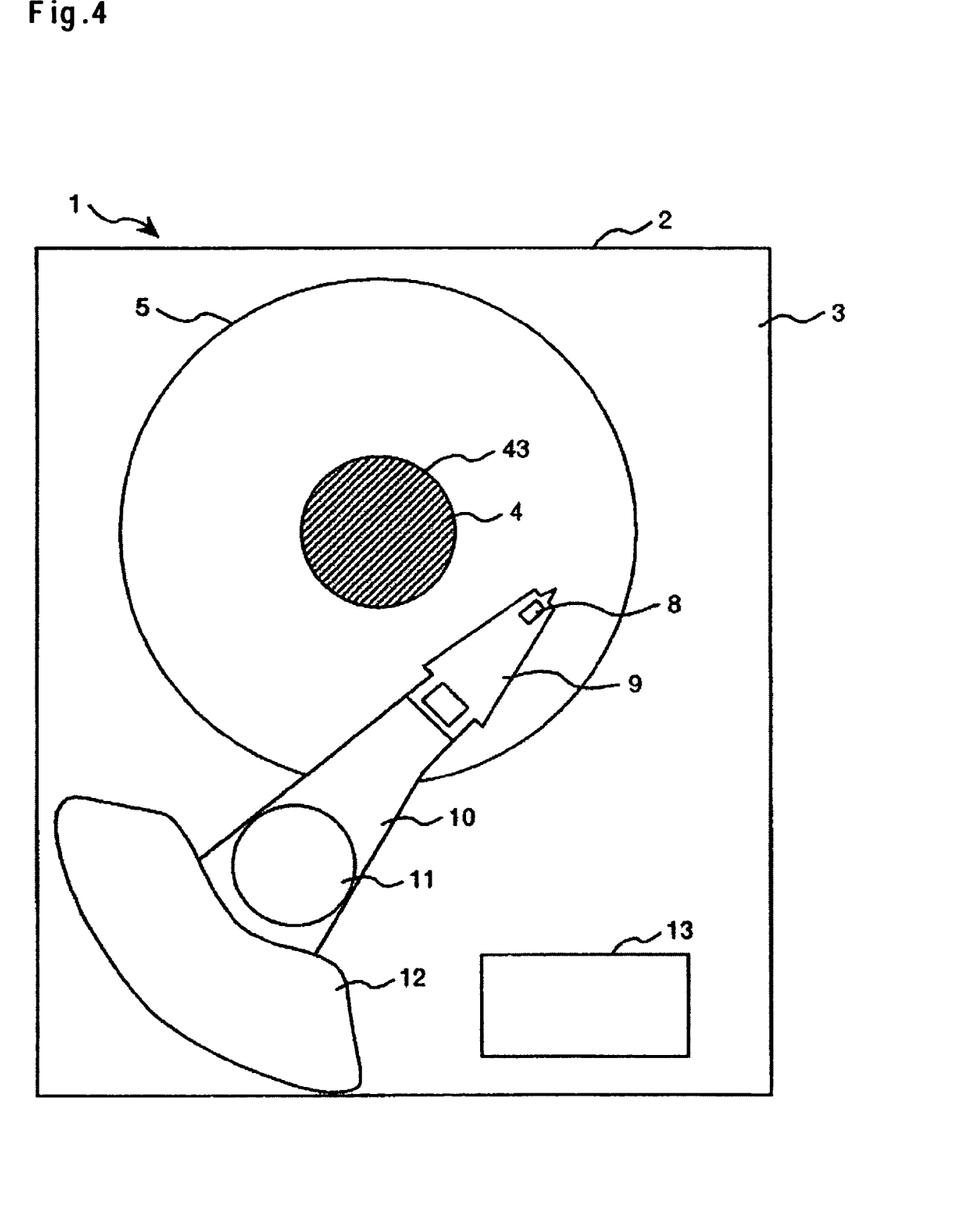
FIG. 4 is a schematic plan view of a magnetic disk drive provided with a spindle motor according to an embodiment of the present invention.

Specific embodiments of the present invention will be described with reference to the accompanying drawings. FIG. 4 shows a magnetic disk drive 1 in a schematic plan view, the magnetic disk drive 1 has a case 2 having a base 3, a spindle motor 4 provided with a hub 43 and mounted on the base 3, one or a plurality of magnetic disks 5 mounted on the hub 43 of the spindle motor 4, a magnetic head 8 for writing information to and reading recorded information from the magnetic disk 5, a suspension 9 for supporting the magnetic head 8, a carriage arm 10 holding the suspension 9, a carriage support shaft 11 supporting the carriage arm 10 for turning and pivotally supported on the base 3, a voice coil motor 12 for turning the carriage arm 10 on the carriage support shaft 11, and a circuit board 13 provided with functional devices including a signal processing device, a motor driver and a disk controller.

Figure 1:
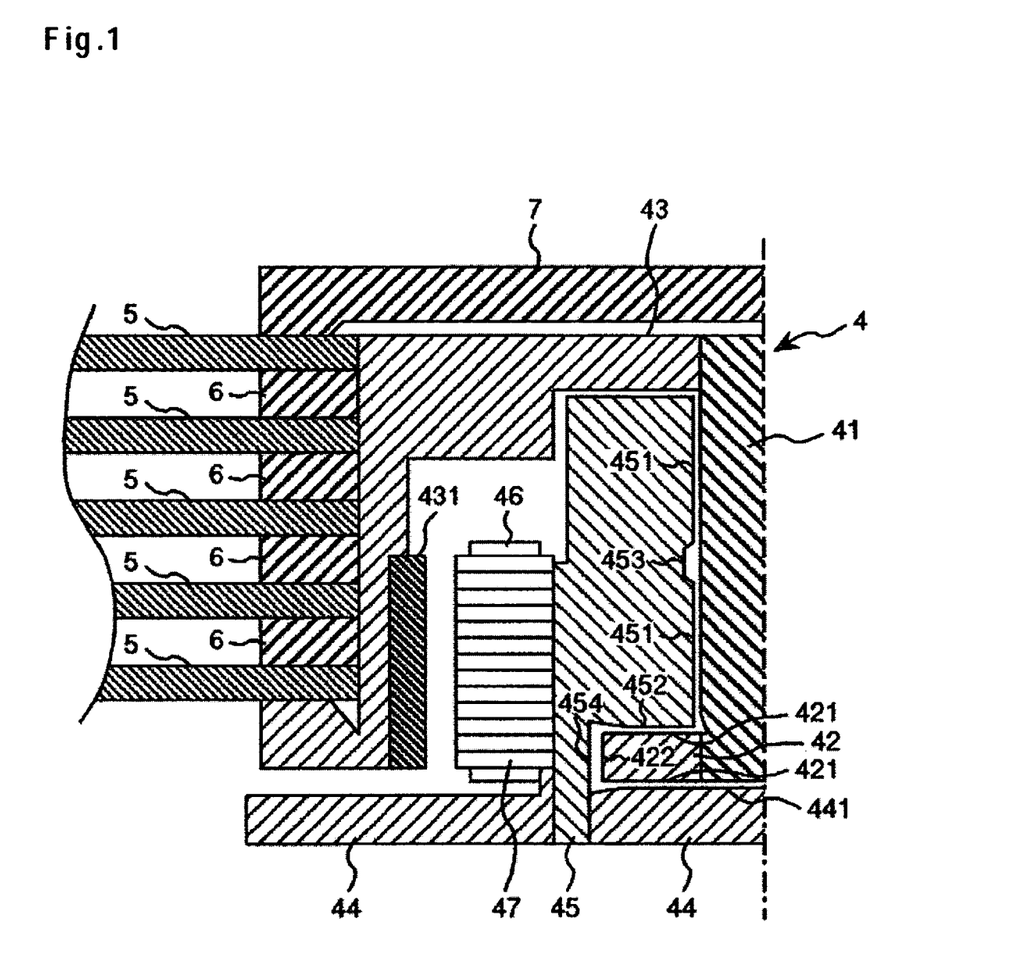
FIG. 1 is a sectional view of a spindle motor in an embodiment of the present invention mounted with magnetic disks.

FIG. 1 shows the spindle motor 4 mounted with the magnetic disks 5. Since the spindle motor 4 is symmetrical with respect to the axis of a rotational shaft 41, the spindle motor 4 is shown in a half section in FIG. 1. A motor base 44 attached to the base 3 of the case 2 is formed integrally with a cylindrical sleeve 45. A stator yoke 46 is put on the sleeve 45. A coil 47 is wound round the stator yoke 46. The sleeve 45 has an inside surface serving as a radial-bearing surface 451 forming a radial bearing together with the outside surface of the rotational shaft 41, and an end surface serving as a thrust bearing surface 452 forming a thrust bearing together with a thrust plate 42 attached to the rotational shaft 41. A lubricating oil holding mechanism (recess, groove) 453 for holding lubricating oil therein is formed in the radial-bearing surface 451 of the sleeve 45. The lubricating oil holding mechanism 453 may be an annular groove or a plurality of grooves formed in the radial-bearing surface 451. A gap capable of holding the lubricating oil is formed between the circumference 422 of the thrust plate 42 and the inside surface 454 of the sleeve 45. Respective opposite surfaces of the thrust plate 42 and the motor base 44 are thrust-bearing surfaces 421 and 441.

The hub 43 is fixedly put on the rotational shaft 41. The magnetic disks 5 are put on the hub 43 and are spaced from each other by spacers 6. A disk clamp 7 is fastened to the rotational shaft 41 with screws or the like to clamp the magnetic disks 5 between the hub 43 and the disk clamp 7. A rotor magnet 431 is attached to a part facing the stator yoke 46 of the inside surface of the hub 43. The coil 47 of the stator yoke 46 is energized to exert a torque on the rotor magnet 431. Consequently, the rotational shaft 41, the hub 43 and the magnetic disks 5 start rotating.

Figure 2:
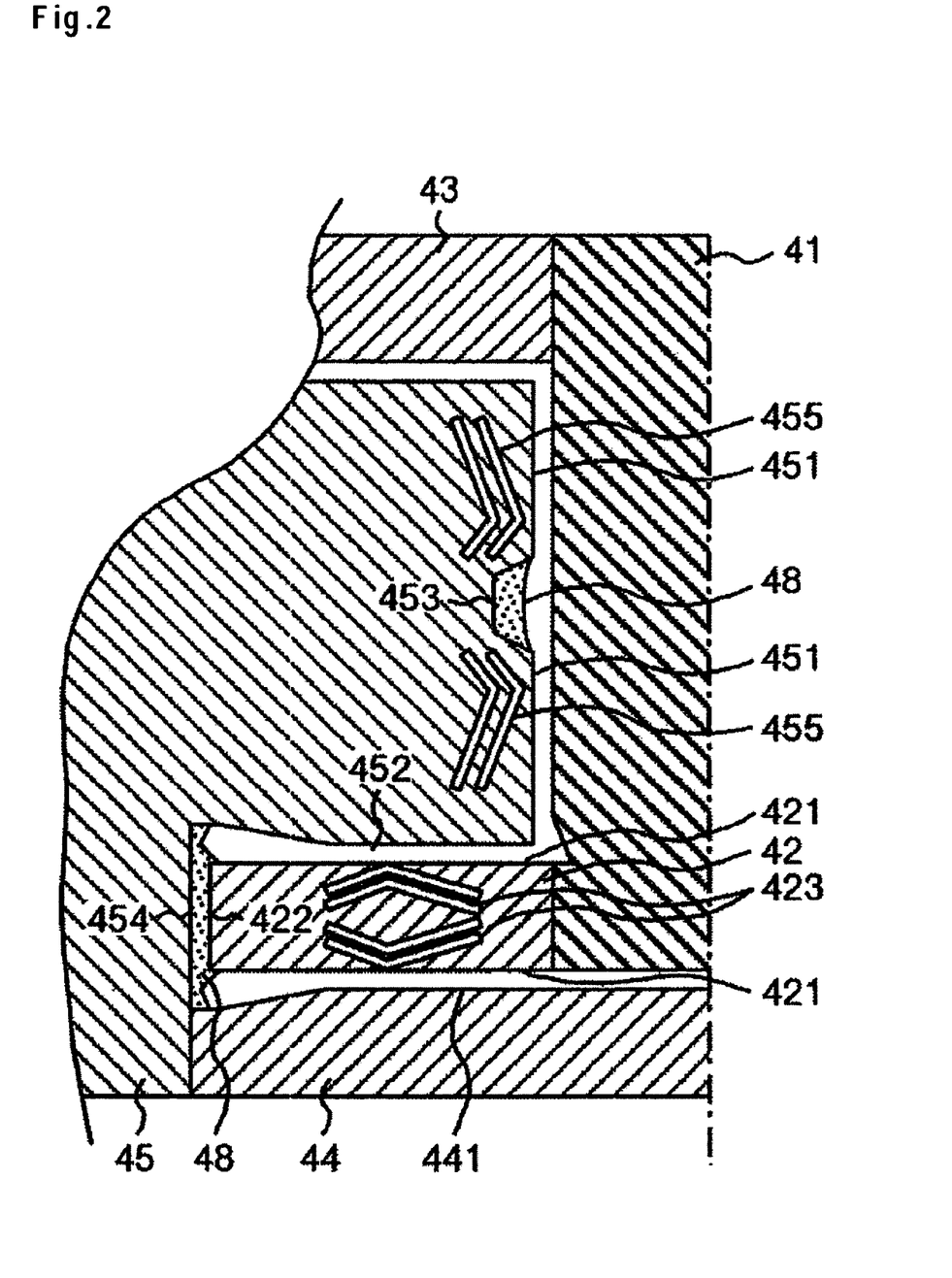
FIG. 2 is an enlarged, fragmentary sectional views of the spindle motor shown in FIG. 1 in a state where a rotational shaft is rotating.
Figure 3:
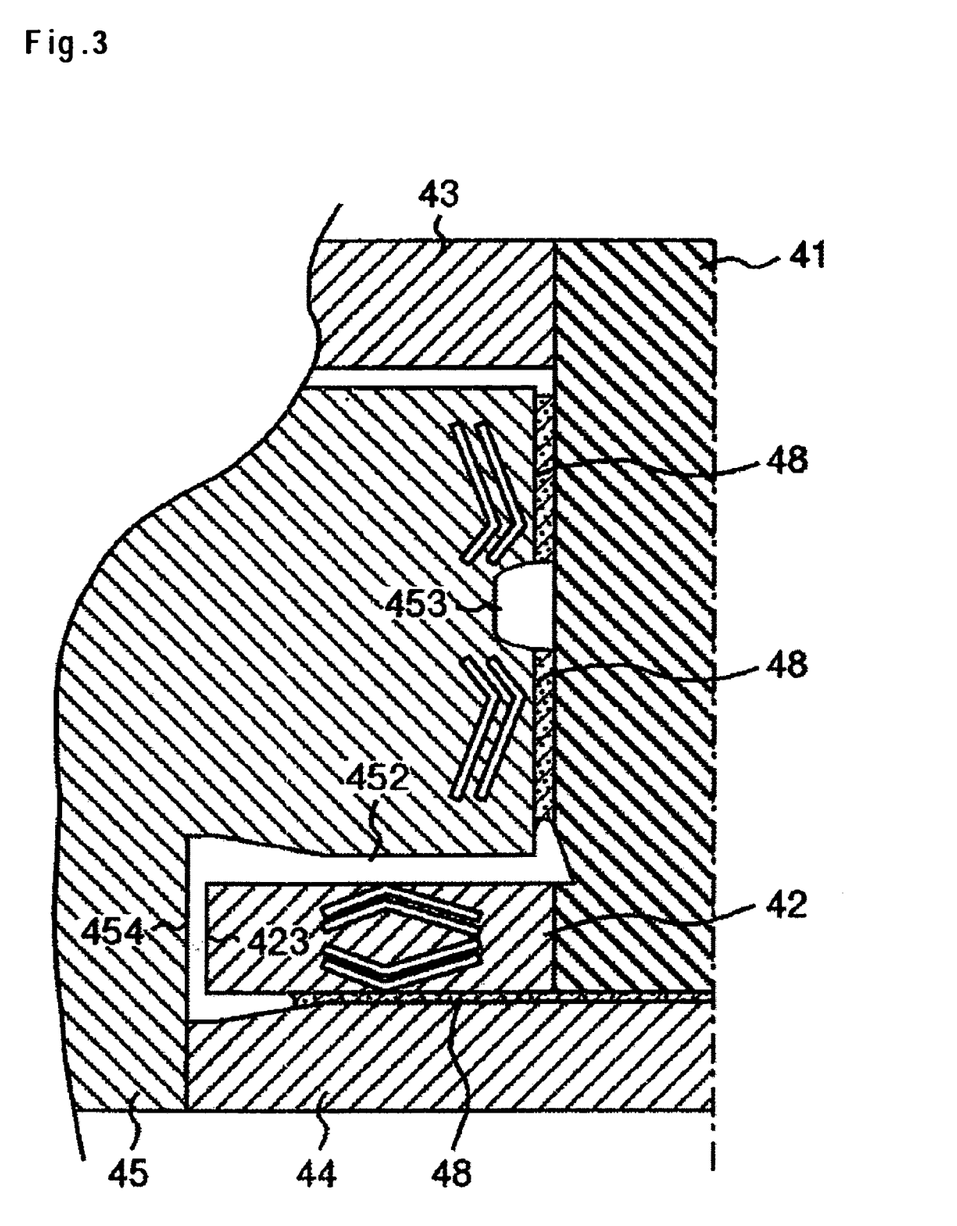
FIG. 3 is an enlarged, fragmentary sectional views of the spindle motor shown in FIG. 1 in a state where the rotational shaft is at a standstill.

FIGS. 2 and 3 are enlarged sectional views of a bearing part of the spindle motor 4. In this embodiment, lubricating oil 48 is contained in an air bearing part. Dynamic pressure generating grooves 455 are formed in a herringbone shape in the radial-bearing surface 451 of the sleeve 45. Dynamic pressure generating grooves 423 are formed in a herringbone shape in the thrust-bearing surface 421 of the thrust plate 42. The respective radially outer parts of the thrust-bearing surface 452 of the sleeve 45 and the thrust-bearing surface 441 of the motor base 44 are inclined so as to extend away from the thrust plate 42 radially outward, and those outer parts do not serve as bearing surfaces.

FIG. 2 shows a state where the rotational shaft 41 of the spindle motor 4 is rotating. Since the rotational shaft 41 of the spindle motor 4 of this embodiment operates at a high rotational speed not lower than 20 krpm, such as about 30 krpm, centrifugal force has a very significant effect. As shown in FIG. 2, the lubricating oil 48 of a specific weight greater than that of air is forced to move radially outward by centrifugal force and collects in the recess 453 formed in the sleeve 45 and not serving as a bearing, and the gap between the circumference 422 of the thrust plate 42 and the inside surface 454 of the sleeve 45. Since the lubricating oil collects and is held in regions that do not function as a bearing, power consumption attributable to the viscosity of the lubricating oil can be limited to a very low level, and heat generation attributable to the viscosity of the lubricating oil 48 can be suppressed. Since the lubricating oil 48 has a very high conductivity as compared with that of air, the lubricating oil 48 collected in the gap between the outer circumference 422 of the thrust plate 42 and the inside surface 454 of the sleeve 45 connects electrically the rotational shaft 41, i.e., a rotational member, and the sleeve 45, i.e., a stationary member.

FIG. 3 shows a state where the rotational shaft 41 of the spindle motor 4 is at a standstill. Any force, such as centrifugal force that urges the lubricating oil 48 radially outward, does not act on the lubricating oil 48 while the rotational shaft 41 is at a standstill. Gaps in the radial bearing part and the thrust bearing part are very small and the thickness of the gaps is in the range of several micrometers to several tens micrometers. Therefore, the lubricating oil 48 contained in the recess 453 flows into the radial bearing part by capillarity. At the same time, the lubricating oil 48 collected in the gap between the circumference 422 of the thrust plate 42 and the inside surface 454 of the sleeve 45 flows into the thrust bearing part by capillarity. Generally, a highly fluidic lubricating oil is used for lubricating a fluid bearing and such lubricating oil is highly capable of penetrating into minute gaps. Since the radial bearing part and the thrust bearing part are thus lubricated by the lubricating oil, the abrasion of the metal components of the bearings due to direct metal-to-metal contact can be prevented while the rotational shaft 41 is at a standstill. Damaging the component parts by particles produced by the abrasion of the component parts can be prevented.

Although this embodiment causes the fluidic lubricating oil to flow into the bearing parts by capillary, a magnetic lubricating oil may be used and the magnetic lubricating oil may be caused to flow into the bearing parts by magnetism.

Generally, a rotational shaft supported on a stationary member by an air bearing slides relative to the stationary member for a period between a moment when the rotational shaft starts rotating and a moment when the rotating speed of the rotational shaft reaches a rotational speed at which a force sufficient to make the rotational shaft float in the air is generated. Therefore, the bearing part is abraded and damaged during this period. In this embodiment of the present invention, the lubricating oil held in the bearing parts lubricates the bearing parts at the start of rotation of the rotational shaft and thereby the wear of the bearing part can be limited to the least extent. The lubricating oil having a viscosity far higher than that of air is capable of generating a sufficient lifting force at the stage where the rotational shaft is rotating at low rotational speeds. Thus, the bearing parts using the lubricating oil, as compared with a simple air bearing, is capable of making the rotational shaft start floating at a lower rotational speed, and thereby the frictional wear of the bearing part can be further reduced.

The lubricating oil prevents abrading and causing damage to the bearing part due to metal-to-metal contact in the bearing part even if the magnetic disk drive is vibrated intensely by external shocks exerted thereon during transportation or handling.

The magnetic disk drive provided with the spindle motor in this embodiment is capable of rotating the magnetic disks at a high rotational speed on the order of 30 krpm and, therefore, of transferring data at a high data transfer rate.

Features of the present invention are as follows. According to one aspect, a spindle motor includes a motor base having a thrust-bearing surface; a sleeve attached to the motor base and having an interior radial bearing surface and a thrust-bearing surface; a stator yoke put on the sleeve so as to surround the sleeve, and holding a coil thereon; a rotational shaft inserted in the sleeve, provided at one end thereof with a thrust plate having opposite thrust-bearing surfaces facing the respective thrust-bearing surfaces of the motor base and the sleeve, and at the other end thereof with a hub having a radial bearing surface facing the radial-bearing surface of the sleeve; and a rotor magnet attached to a part of the hub facing the stator yoke. The radial-bearing surface of the sleeve is provided with a lubricating oil holding mechanism for holding lubricating oil while the rotational shaft is rotating, and a gap not forming a bearing is formed between the circumference of the thrust plate and the inside surface of the sleeve to hold the lubricating oil while the rotational shaft is rotating.

The lubricating oil holding mechanism may be a recess formed in the radial-bearing surface of the sleeve. The lubricating oil holding mechanism may be an annular groove formed in the radial-bearing surface of the sleeve.

In accordance with another aspect, a spindle motor includes a motor base having a thrust-bearing surface; a sleeve attached to the motor base and having a radial bearing surface and a thrust-bearing surface; a stator yoke put on the sleeve so as to surround the sleeve, and holding a coil thereon; a rotational shaft provided at one end thereof with a thrust plate having opposite thrust bearing surfaces facing the respective thrust-bearing surfaces of the motor base and the sleeve, and at the other end thereof with a hub, having a radial bearing surface extending from the thrust plate to the hub, and inserted in the sleeve to form a radial bearing between the rotational shaft and the radial-bearing surface of the sleeve and to form a thrust bearing between the respective thrust-bearing surfaces of the motor base and the sleeve; and a rotor magnet attached to a part of the hub facing the stator yoke. The radial-bearing surface of the sleeve is provided with a recess, and a gap not forming a bearing is formed between the circumference of the thrust plate and the inside surface of the sleeve, lubricating oil is held in the radial bearing and the thrust bearing while the rotational shaft is at a standstill, and the lubricating oil is held in the recess and the gap while the rotational shaft is rotating. The recess may be an annular groove formed in the radial-bearing surface of the sleeve.

According to another aspect, a spindle motor comprises a motor base having a thrust-bearing surface; a sleeve attached to the motor base, and having an inside radial-bearing surface provided with a recess and a thrust-bearing surface perpendicular to the radial-bearing surface; a stator yoke put on the sleeve so as to surround the sleeve; a coil wound around the stator yoke; a rotational shaft inserted in the sleeve, having a radial-bearing surface facing the radial-bearing surface of the sleeve, provided at one end thereof with a thrust plate having opposite thrust bearing surfaces facing the respective thrust bearing surfaces of the motor base and the sleeve, and a circumference defining a gap not forming a bearing together with the inside surface of the sleeve, and at the other end thereof with a hub; a rotor magnet attached to a part of the hub facing the stator yoke; and lubricating oil that is held in the recess and the gap while the rotational shaft is rotating, and flows from the recess and the gap into a radial bearing having the radial-bearing surfaces and into a thrust bearing having the thrust-bearing surfaces while the rotational shaft is at a standstill.

In specific embodiments, the recess is an annular groove formed in the radial bearing surface of the sleeve. The recess may include a plurality of annular grooves formed in the radial-bearing surface of the sleeve. The radial bearing surface of the sleeve and the thrust-bearing surface of the thrust plate are provided with dynamic pressure generating grooves formed in a herringbone shape. A peripheral part of the thrust-bearing surface of the sleeve and a peripheral part of the thrust-bearing surface of the motor base are inclined so as to extend away from the thrust plate.

According to another aspect, a magnetic disk drive includes a case; a spindle motor installed in the case; a magnetic disk mounted on a hub included in the spindle motor; and a magnetic head for writing information to and reading recorded information from the magnetic disk. The spindle motor includes a motor base having a thrust-bearing surface; a sleeve attached to the motor base and having an interior radial-bearing surface and a thrust-bearing surface; a stator yoke put on the sleeve so as to surround the sleeve, and holding a coil thereon; a rotational shaft inserted in the sleeve, provided at one end thereof with a thrust plate having opposite thrust-bearing surfaces facing the respective thrust-bearing surfaces of the motor base and the sleeve, and at the other end thereof with a hub having a radial-bearing surface facing the radial-bearing surface of the sleeve; and a rotor magnet attached to a part of the hub facing the stator yoke. The radial-bearing surface of the sleeve is provided with lubricating oil holding mechanism for holding lubricating oil while the rotational shaft is rotating, and a gap not forming a bearing is formed between the circumference of the thrust plate and the inside surface of the sleeve to hold the lubricating oil while the rotational shaft is rotating.

The lubricating oil holding mechanism may be a recess formed in the radial-bearing surface of the sleeve. The lubricating oil holding mechanism may be an annular groove formed in the radial-bearing surface of the sleeve.

In accordance with another aspect, a magnetic disk drive includes a case; a spindle motor installed in the case; a magnetic disk mounted on a hub included in the spindle motor; and a magnetic head for writing information to and rereading recorded information from the magnetic disk. The spindle motor includes, a motor base having a thrust-bearing surface; a sleeve attached to the motor base and having a radial-bearing surface and a thrust-bearing surface; a stator yoke put on the sleeve so as to surround the sleeve, and holding a coil thereon; a rotational shaft provided at one end thereof with a thrust plate having opposite thrust-bearing surfaces and at the other end thereof with a hub, having a radial-bearing surface extending from the thrust plate to the hub, and inserted in the sleeve to form a radial bearing between the rotational shaft and the radial-bearing surface of the sleeve and to form a thrust bearing between the respective thrust-bearing surfaces of the motor base and the sleeve; and a rotor magnet attached to a part of the hub facing the stator yoke. The radial-bearing surface of the sleeve is provided with a recess, and a gap not forming a bearing is formed between the circumference of the thrust plate and the inside surface of the sleeve, lubricating oil is held in the radial bearing and the thrust bearing while the rotational shaft is at a standstill, and the lubricating oil is held in the recess and the gap while the rotational shaft is rotating. The recess may be an annular groove formed in the radial-bearing surface of the sleeve.

According to another aspect, a magnetic disk drive includes a case; a spindle motor installed in the case; a magnetic disk mounted on a hub included in the spindle motor; and a magnetic head for writing information to and reading recorded information from the magnetic disk. The spindle motor includes a motor base having a thrust-bearing surface; a sleeve attached to the motor base, and having an inside radial-bearing surface provided with a recess and a thrust-bearing surface perpendicular to the radial-bearing surface; a stator yoke attached to the sleeve so as to surround the sleeve; a coil wound around the stator yoke; a rotational shaft inserted in the sleeve, and provided at one end thereof with a thrust plate having a radial-bearing surface facing the radial-bearing surface of the sleeve, opposite thrust-bearing surfaces facing the respective thrust-bearing surfaces of the motor base and the sleeve, and a circumference defining a gap not forming a bearing together with the inside surface of the sleeve, and at the other attached to the other end thereof; a rotor magnet attached to a part of the hub facing the stator yoke; and lubricating oil that is held in the recess and the gap while the rotational shaft is rotating, and flows from the recess and the gap into a radial bearing having the radial-bearing surfaces and into a thrust bearing having the thrust-bearing surfaces while the rotational shaft is at a standstill.

In specific embodiments, the recess is an annular groove formed in the radial-bearing surface of the sleeve. The recess may include a plurality of annular grooves formed in the radial-bearing surface of the sleeve. The radial-bearing surface of the sleeve and the thrust-bearing surfaces of the thrust plate are provided with dynamic pressure generating grooves formed in a herringbone shape. A peripheral part of the thrust-bearing surface of the sleeve and a peripheral part of the thrust-bearing surface of the motor base are inclined so as to extend away from the thrust plate.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A spindle motor comprising:
   a motor base having a thrust-bearing surface;
   a sleeve attached to the motor base and having an interior radial bearing surface and a thrust-bearing surface;
   a stator yoke disposed on the sleeve so as to surround the sleeve, and holding a coil thereon;
   a rotational shaft inserted in the sleeve, provided at one end thereof with a thrust plate having opposite thrust-bearing surfaces facing the respective thrust-bearing surfaces of the motor base and the sleeve, defining a dynamic air thrust bearing, and at the other end thereof with a hub having a radial bearing surface facing the radial-bearing surface of the sleeve, defining a dynamic air radial bearing; and
   a rotor magnet attached to a part facing the stator yoke of the hub;
   wherein the radial-bearing surface of the sleeve includes a lubricating oil holding mechanism to hold lubricating oil while the rotational shaft is rotating, and a gap not forming a bearing is formed between the circumference of the thrust plate and the inside surface of the sleeve to hold the lubricating oil while the rotational shaft is rotating.

2. The spindle motor according to claim 1, wherein the lubricating oil holding mechanism comprises a recess formed in the radial-bearing surface of the sleeve.

3. The spindle motor according to claim 1, wherein the lubricating oil holding mechanism comprises an annular groove formed in the radial-bearing surface of the sleeve.

4. A spindle motor comprising:
   a motor base having a thrust-bearing surface;
   a sleeve attached to the motor base and having a radial bearing surface and a thrust-bearing surface;
   a stator yoke disposed on the sleeve so as to surround the sleeve, and holding a coil thereon;
   a rotational shaft provided at one end thereof with a thrust plate having opposite thrust bearing surfaces facing the respective thrust-bearing surfaces of the motor base and the sleeve, and at the other end thereof with a hub, having a radial bearing surface extending from the thrust plate to the hub, and inserted in the sleeve to form a dynamic air radial bearing between the rotational shaft and the radial-bearing surface of the sleeve and to form a dynamic air thrust bearing between the respective thrust-bearing surfaces of the motor base and the sleeve; and
   a rotor magnet attached to a part of the hub facing the stator yoke;
   wherein the radial-bearing surface of the sleeve is provided with a recess, and a gap not forming a bearing is formed between the circumference of the thrust plate and the inside surface of the sleeve, lubricating oil is held in the radial bearing and the thrust bearing while the rotational shaft is at a standstill, and the lubricating oil is held in the recess and the gap while the rotational shaft is rotating.

5. The spindle motor according to claim 4, wherein the recess comprises an annular groove formed in the radial-bearing surface of the sleeve.

6. A spindle motor comprising:
   a motor base having a thrust-bearing surface;
   a sleeve attached to the motor base, and having an inside radial-bearing surface provided with a recess and a thrust-bearing surface perpendicular to the radial-bearing surface;
   a stator yoke disposed on the sleeve so as to surround the sleeve;
   a coil wound around the stator yoke;
   a rotational shaft inserted in the sleeve, having a radial-bearing surface facing the radial-bearing surface of the sleeve defining a dynamic air radial bearing, provided at one end thereof with a thrust plate having opposite thrust bearing surfaces facing the respective thrust bearing surfaces of the motor base and the sleeve defining a dynamic air thrust bearing, and a circumference defining a gap not forming a bearing together with the inside surface of the sleeve, and at the other end thereof with a hub;
   a rotor magnet attached to a part of the hub facing the stator yoke; and
   lubricating oil that is held in the recess and the gap while the rotational shaft is rotating, and flows from the recess and the gap into the radial bearing having the radial-bearing surfaces and into the thrust bearing having the thrust surfaces while the rotational shaft is at a standstill.

7. The spindle motor according to claim 6, wherein the recess comprises an annular groove formed in the radial bearing surface of the sleeve.

8. The spindle motor according to claim 6, wherein the radial-bearing surface of the sleeve and the thrust-bearing surfaces of the thrust plate are provided with dynamic pressure generating grooves formed in a herringbone shape.

9. The spindle motor according to claim 6, wherein a peripheral part of the thrust-bearing surface of the sleeve and a peripheral part of the thrust-bearing surface of the motor base are inclined so as to extend away from the thrust plate.

10. A magnetic disk drive comprising:
a case;
a spindle motor installed in the case;
a magnetic disk mounted on a hub included in the spindle motor; and
a magnetic head configured to write information to and read recorded information from the magnetic disk;
wherein the spindle motor includes:
a motor base having a thrust-bearing surface;
a sleeve attached to the motor base and having an interior radial bearing surface and a thrust-bearing surface;
a stator yoke disposed on the sleeve so as to surround the sleeve, and holding a coil thereon;
a rotational shaft inserted in the sleeve, provided at one end thereof with a thrust plate having opposite thrust-bearing surfaces facing the respective thrust-bearing surfaces of the motor base and the sleeve defining a dynamic air thrust bearing, and at the other end thereof with a hub having a radial bearing surface facing the radial-bearing surface of the sleeve defining a dynamic air radial bearing; and
a rotor magnet attached to a part of the hub facing the stator yoke;
wherein the radial-bearing surface of the sleeve is provided with lubricating oil holding mechanism to hold lubricating oil while the rotational shaft is rotating, and a gap not forming a bearing is formed between the circumference of the thrust plate and the inside surface of the sleeve to hold the lubricating oil while the rotational shaft is rotating.

11. The magnetic disk drive according to claim 10, wherein the lubricating oil holding mechanism comprises a recess formed in the radial-bearing surface of the sleeve.

12. The magnetic disk drive according to claim 10, wherein the lubricating oil holding mechanism comprises an annular groove formed in the radial-bearing surface of the sleeve.

13. A magnetic disk drive comprising:
a case;
a spindle motor installed in the case;
a magnetic disk mounted on a hub included in the spindle motor; and
a magnetic head configured to write information to and read recorded information from the magnetic disk;
wherein the spindle motor includes:
a motor base having a thrust-bearing surface;
a sleeve attached to the motor base and having a radial bearing surface and a thrust-bearing surface;
a stator yoke disposed on the sleeve so as to surround the sleeve, and holding a coil thereon;
a rotational shaft provided at one end thereof with a thrust plate having opposite thrust bearing surfaces and at the other end thereof with a hub, having a radial bearing surface extending from the thrust plate to the hub, and inserted in the sleeve to form a dynamic air radial bearing between the rotational shaft and the radial-bearing surface of the sleeve and to form a dynamic air thrust bearing between the respective thrust-bearing surfaces of the motor base and the sleeve; and
a rotor magnet attached to a part of the hub facing the stator yoke;
wherein the radial-bearing surface of the sleeve is provided with a recess, and a gap not forming a bearing is formed between the circumference of the thrust plate and the inside surface of the sleeve, lubricating oil is held in the radial bearing and the thrust bearing while the rotational shaft is at a standstill, and the lubricating oil is held in the recess and the gap while the rotational shaft is rotating.

14. The magnetic disk drive according to claim 13, wherein the recess comprises an annular groove formed in the radial-bearing surface of the sleeve.

15. A magnetic disk drive comprising:
a case;
a spindle motor installed in the case;
a magnetic disk mounted on a hub included in the spindle motor; and
a magnetic head configured to write information to and read recorded information from the magnetic disk;
wherein the spindle motor includes:
a motor base having a thrust-bearing surface;
a sleeve attached to the motor base, and having an inside radial-bearing surface provided with a recess and a thrust-bearing surface perpendicular to the radial-bearing surface;
a stator yoke attached to the sleeve so as to surround the sleeve;
a coil wound around the stator yoke;
a rotational shaft inserted in the sleeve, having a radial-bearing surface facing the radial-bearing surface of the sleeve, defining a dynamic air radial bearing, and provided at one end thereof with a thrust plate having opposite thrust bearing surfaces facing the respective thrust bearing surfaces of the motor base and the sleeve, defining a dynamic air thrust bearing, and a circumference defining a gap not forming a bearing together with the inside surface of the sleeve, and the hub attached to the other end thereof;
a rotor magnet attached to a part of the hub facing the stator yoke; and
lubricating oil that is held in the recess and the gap while the rotational shaft is rotating, and flows from the recess and the gap into a radial bearing having the radial-bearing surfaces and into a thrust bearing having the thrust surfaces while the rotational shaft is at a standstill.

16. The magnetic disk drive according to claim 15, wherein the recess comprises an annular groove formed in the radial bearing surface of the sleeve.

17. The magnetic disk drive according to claim 15, wherein the radial-bearing surface of the sleeve and the thrust-bearing surfaces of the thrust plate are provided with dynamic pressure generating grooves formed in a herringbone shape.

18. The magnetic disk drive according to claim 15, wherein a peripheral part of the thrust-bearing surface of the sleeve and a peripheral part of the thrust-bearing surface of the motor base are inclined so as to extend away from the thrust plate.

* * * * *